United States Patent [19]

Grossi

[11] 4,188,863
[45] Feb. 19, 1980

[54] AUTOMATIC MACHINE FOR THE PRODUCTION OF COFFEE FROM ROASTED COFFEE BEANS

[76] Inventor: Lucio Grossi, Via Mazzini, 29, Bergamo, Italy

[21] Appl. No.: 952,819

[22] Filed: Oct. 19, 1978

[30] Foreign Application Priority Data

Oct. 28, 1977 [IT] Italy ............................. 29124 A/77

[51] Int. Cl.² ............................................. A47J 31/42
[52] U.S. Cl. .................................... 99/286; 99/289 R
[58] Field of Search ...................... 99/286, 288, 289 R, 99/289 T, 289 D, 289 P, 302 P, 302 R

[56] References Cited

U.S. PATENT DOCUMENTS

| | | | |
|---|---|---|---|
| 3,007,391 | 11/1961 | Reynolds | 99/289 |
| 3,266,410 | 8/1966 | Novi | 99/289 |
| 3,327,615 | 6/1967 | Swan | 99/289 |
| 3,369,478 | 2/1968 | Black | 99/289 |
| 4,007,675 | 2/1977 | Cailliot | 99/286 |
| 4,074,621 | 2/1978 | Cailliot | 99/286 |

Primary Examiner—Robert W. Jenkins
Attorney, Agent, or Firm—Kurt Kelman

[57] ABSTRACT

An automatic coffee-making machine comprising a grinder delivering ground coffee to a metering device storing a metered quantity of ground coffee and of releasing the metered quantity to a delivery chute displaceable from an inoperative position to an operative position above a fixed filter carrier in which is disposed a lower filter for the support of delivered ground coffee. The grinder is driven by a motor responsive to the delivery of a metered quantity of ground coffee to disconnect the motor from the grinder. A piston and cylinder arrangement delivers a measured quantity of hot water to the fixed filter carrier and is displaceable between a lower position to confine the ground coffee therein and to deliver hot water thereto and an upper position. The piston and cylinder arrangement is angularly displaced by camming surfaces responsive to the displacement between the lower and upper positions, and is displaced between the lower by a motor-driven linkage mechanism which also upper positions and displaces the lower filter to raise used ground coffee to an ejection position. The chute is angularly displaced by the piston and cylinder arrangement to the operative position in which it opens the metering device to receive and deliver the metered quantity of ground coffee to the fixed filter carrier in readiness for the next cycle of operation.

18 Claims, 5 Drawing Figures

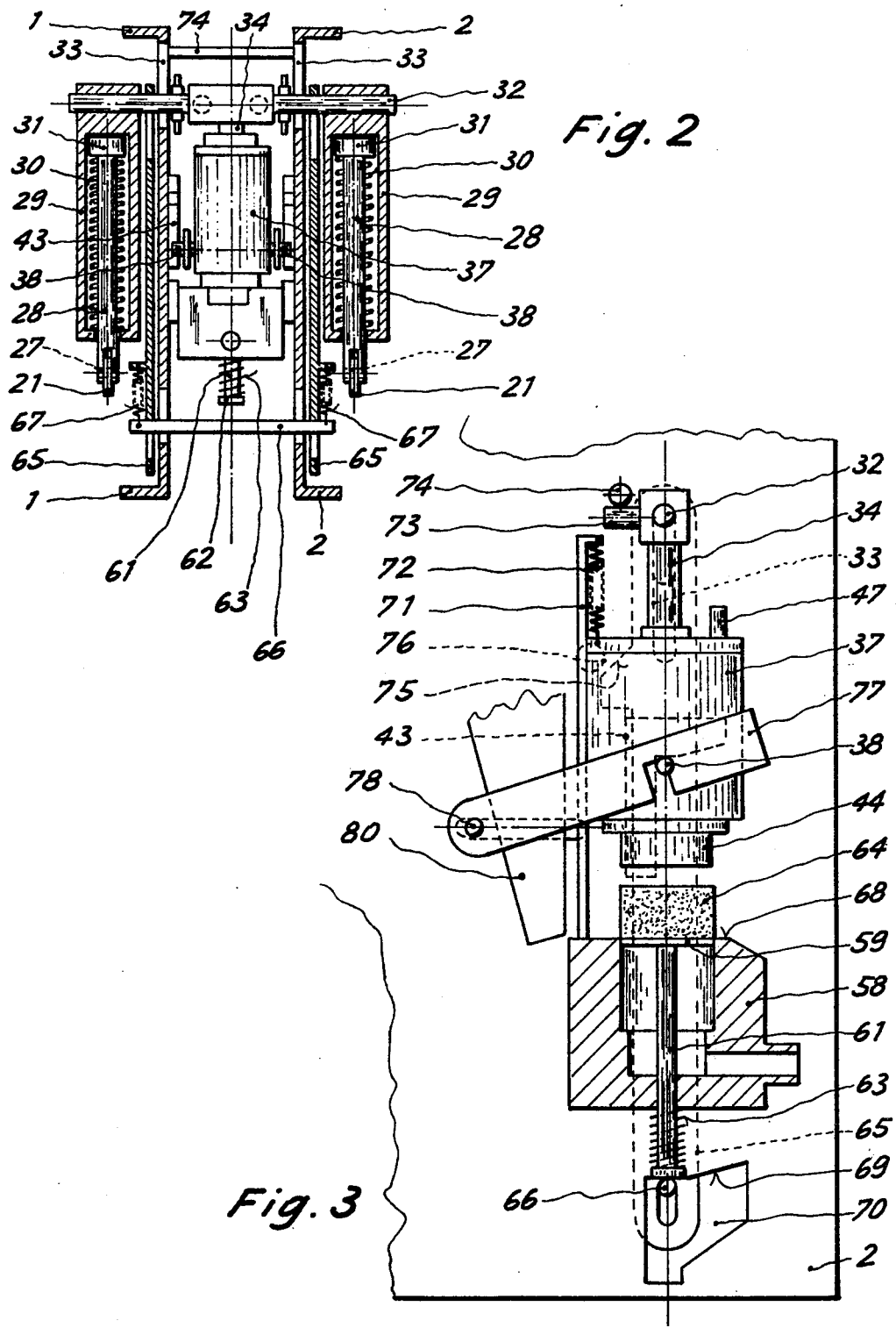

AUTOMATIC MACHINE FOR THE PRODUCTION OF COFFEE FROM ROASTED COFFEE BEANS

FIELD OF THE INVENTION

The present invention relates to an automatic machine for the production of coffee, particularly but not exclusively, espresso coffee, from coffee beans, the machine being adapted for use in the family and as a unit in a bar and for automatic communal distribution.

BACKGROUND OF THE INVENTION

For a considerable time various types of machines for the so-called "instantaneous" production of coffee, that is of caffe espresso, have been known, these machines incorporating a grinder for the metered grinding of the coffee beans. In general, the known machines are constituted of a grinding-metering unit delivering a metered quantity of ground powder, a boiler unit for heating the water and the coffee unit by means of a thermosiphon system or by direct contact, a water metering unit either of an electrical type with a probe or a piston and cylinder type, and an electrically driven pump for generating the required water pressure.

These machines in general are based upon the principle of expelling the used pellet by means of a suitable movement of the lower filter (coffee delivery filter); in some cases, a system of levers and cams which actuates the lower filter and the upper closure tap is used for this movement, while in other cases a hydraulic system controlled by electrically operated valves is used. In such machines, the grinding and metering of the coffee are effected by operating the grinder by means of a timer which predetermines the dose on the basis of the operating time, or by interlocking the motor of the grinder with a metering device which operates a pallet, which acts upon a microswitch actuated by the ground coffee. These known types of automatic machines with boilers, which continuously maintain pressurised water at about 100° C., exhibit various disadvantages in practical use, including: the requirement of safety-valves on the boiler with inevitable loss of water and steam, the necessity for removing lime from the water by suitable purifiers and also a complex electrical installation.

It is an object of the present invention to provide an improved automatic machine for the production of coffee, particularly caffe espresso or other less concentrated type of coffee from beans in which the disadvantages referred to above are materially reduced. It is a further object of the present invention to provide an improved automatic machine for the production of coffee which is of such electrical and mechanical simplicity as to avoid the requirement of specialized maintenance personnel.

It is another object of the invention to provide a highly efficient and safe machine, of limited bulk, free from electrical and hydraulic servomechanisms and capable of operating constantly and regularly over a significant period of time.

BRIEF SUMMARY OF THE INVENTION

This invention provides an automatic machine for the production of drinking coffee from coffee beans comprising a grinder for grinding the beans, a motor for driving the grinder, a metering device for receiving ground coffee from said grinder, latch means responsive to a metered quantity of coffee in said metering device to disconnect said motor from said grinder, a source of water, a water dispensing displaceable piston and cylinder arrangement, normally closed means for supplying water from said source to said dispensing piston and cylinder arrangement, opening means associated with said piston and cylinder arrangement and operable by displacement thereof to open said normally closed water supply means, water heating means associated with said dispensing piston and cylinder arrangement, a fixed filter support, a lower filter within said fixed filter support for supporting ground coffee and displaceable between a lower coffee making position and an upper position for the ejection of used coffee, a chute displaceable between an inoperative position and an operative position for the delivery of ground coffee from said metering device to said fixed filter support, connecting means between said chute and said metering device operable to open said metering device to said chute in response to displacement of said chute to the operative position, a pallet displaceable with said dispensing piston and cylinder arrangement and operable to eject used coffee in the upper position of said lower filter, camming means associated with said piston and cylinder arrangement responsive to displacement thereof to angularly displace the piston and cylinder arrangement and said pallet, a projection associated with said dispensing cylinder operable to enter said fixed filter support to confine the ground coffee therein and to supply water thereto from said dispensing cylinder and displaceable with said cylinder between a position in which it extends into said fixed filter support and a position free therefrom, a linkage system driven by said motor operable sequentially to displace said piston and cylinder arrangement away from said fixed filter support to free said projection therefrom and to open said normally closed water supply means, displace said lower filter to said upper position, angularly displace said piston and cylinder arrangement and said pallet to eject used coffee, bring said chute to the operative position to deliver a metered quantity of ground coffee to said fixed filter support and return the piston and cylinder arrangement, the lower filter and the chute to an initial starting position.

The invention can be understood more clearly from the following detailed description of one of its preferred but non-limiting forms of practical embodiment, prepared with reference to the attached sheets of drawings, given in a purely indicative and non-limiting manner.

BRIEF DESCRIPTION OF THE DRAWINGS

FIG. 2 is a partial section taken along the line A—A of FIG. 1, FIG. 3 is a part elevational and part sectional view of the piston and cylinder unit incorporated in the machine of FIG. 1 and is shown raised from the lower fixed filter support with a used coffee pellet in a position raised from the filter.

Figures 1, 5:
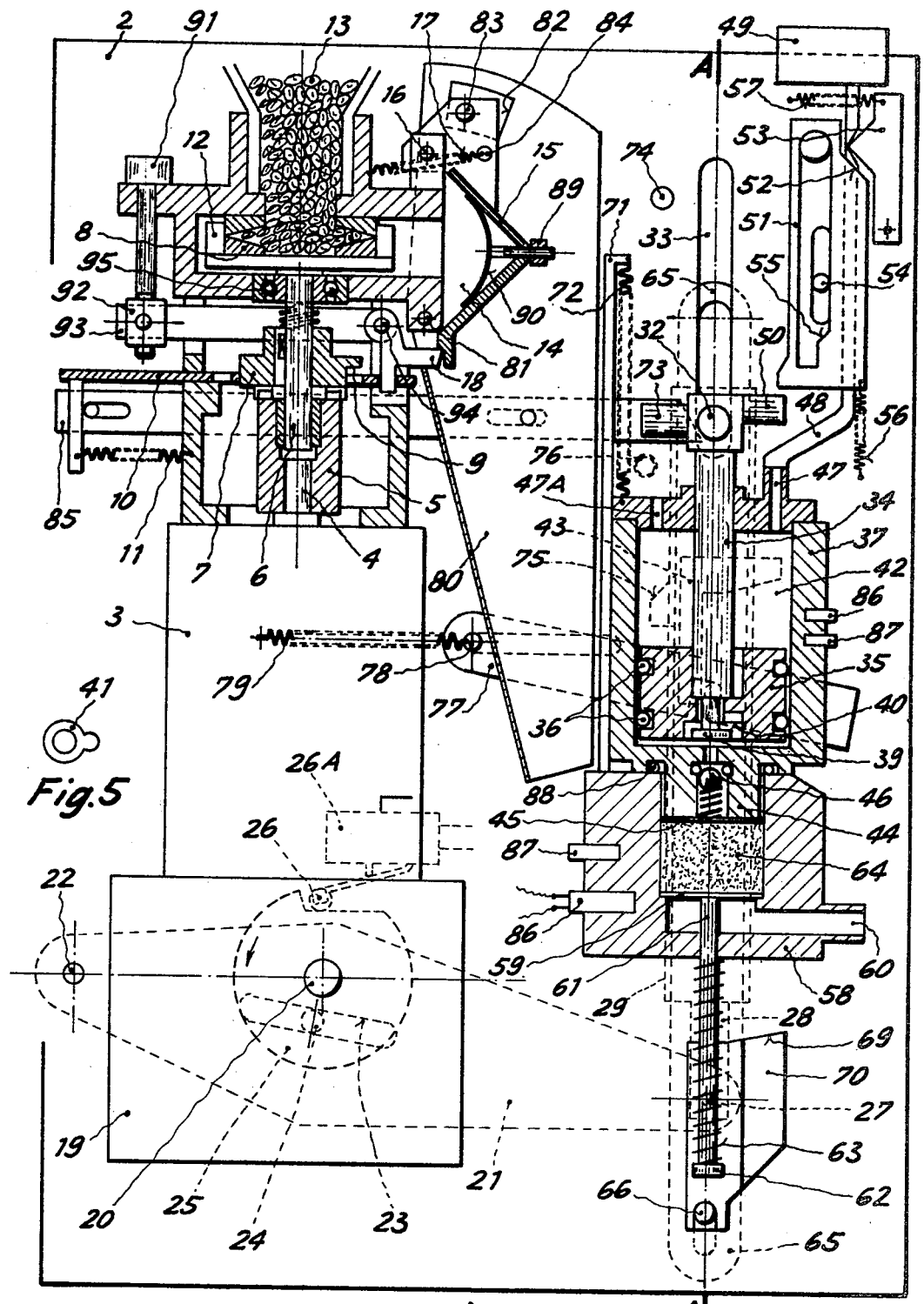
FIG. 1 is an axial section through an automatic coffee machine constructed according to this invention.
FIG. 5 is a diagrammatic view of a detail.

In these figures and in particular in FIGS. 1 and 2, an automatic coffee machine according to the present invention is shown in an at-rest position with a used coffee pellet in position, that is closed between the lower filter and upper filter.

The machine comprises a support frame composed of two spaced parallel plates 1 and 2 (FIG. 2) between which is mounted a vertical-axis motor 3 having a shaft 4 to which is keyed a clutch plate 5 which is rigidly connected, by means of a clutch plate 7, to a shaft 6 of a plate grinding machine 8. The clutch plate 7 is connected to the shaft of the grinder 6 by an axially sliding key which is subject to the thrust of a spring, and has a peripheral helical projection 9 whereby it can be disengaged from the plate 5 by the lateral displacement of a rod 10 under the influence of a spring 11 (FIG. 1).

Blades 12 associated with the revolving grinder 8 operate to thrust the ground coffee 13 into the space 14 of a lateral metering device 15 which is hinged at 16 and is urged to the closed position by a spring 17. A pivotal pawl 18, having a projection extending into a slot in the rod 10, bears with one end against the metering device 15 and with its other end holds the rod 10 biased by the spring 11 in position. When the space 14 is filled with ground coffee, the pressure of this coffee acts upon the internal wall of the metering device 15, which moves outwards to release the pawl 18. This enables the rod 10 to be displaced by the spring 11 to engage the helical projection 9, during its translatory stroke, and uncouple the clutch 7 thereby uncoupling the grinder without stopping the motor 3.

At the opposite end of the motor shaft 4 is a reduction gear 19 having a shaft 20 which operates two link devices symmetrically arranged with respect to the reduction gear. Each link device comprises a lever 21 articulated on the frame at 22 and having a transverse slot 23 in which slides a pin 24 keyed to a cam wheel 25. A roller 26 associated with a microswitch 26A bears against the outer circumferential surface of one of the cam wheels 25 (FIG. 1) and when the roller falls into a hollow of the cam wheel 25 the microswitch 26A is operated to disconnect the motor 3 from the supply. The free ends of the two levers 21 (FIG. 2) are articulated at 27 to the lower ends of two rod-shaped elements 28 sliding in cylinders 29.

A separate preloaded spring 30 is mounted coaxially about each of the rods 28 between one end of the cylinder 29 and an enlarged head 31 of the rod 28. The two cylinders 29 are connected at the top to a transverse pin 32, capable of sliding in slots 33 formed in the face plates 1 and 2 of the frame (FIG. 2).

To the transverse pin 32 there is connected, in an oscillating manner, a rod 34 connected to a piston 35, which is mounted in a cylinder 37 with piston rings 36 (FIG. 1).

The cylinder 37 is equipped with two opposed trunnions 38 (FIG. 2) and is arranged so that it can be moved in a vertical direction by means of the piston rod 34; the transverse pin 32, displaceable in the slots 33, is also angularly displaceable about its own axis as will become clearer below. The lower end of the rod 34 is not rigidly connected to the piston 35 and has a projection or flange 39 operable to engage a stop 40 in the piston after the first few millimeters of the ascending stroke of the rod 34. The engagement of the flange 39 against the stop 40 exposes an aperture 41, clearly visible in cross-section in FIG. 5, which permits passage of water from the upper part 42 of the cylinder to the lower part below the piston. Because the cylinder 37 is free to move upwards, the continuation of the upward stroke of the piston rod 34 also carries the cylinder upwards due to the friction of the piston rings 36. In practice, in the case where the friction of the sealing rings is not sufficient, the cylinder is nevertheless raised when the piston 35 at the end of its stroke engages the top of the cylinder 37.

Laterally of the cylinder, there are stops 43 which are engaged by the trunnions 38 after a first ascending travel of the cylinder leaving the piston 35 free to ascend to the end of its upward stroke against the effect of friction between piston and cylinder.

The cylinder 37 has, at its lower end, a cylindrical projection or boss 44 with an open ended axial passage which is covered by a filter 45. A ball valve 46 is mounted in this axial passage and is urged against its upper seating by a spring. This valve 46 serves to permit the passage of water by suction from the upper part of the cylinder 37 towards the lower part and, when the water is in the lower part, for preventing it from escaping under gravity.

In the upper part, the cylinder 37 is equipped with a duct 47, connected by a flexible tube 48 to a tank 49 containing water; an aperture 47A places the upper part of the cylinder 37 in communication with the atmosphere. The entry of cold water into the cylinder 37 by gravity from the tank 49, that is the metering of the water, takes place during the first portion of ascent of the cylinder 37. During the ascent of the pin 32, a pin 50 integral with this transverse pin 32 thrusts upwards on a sliding plate 51 which, by means of an inclined face 52 displaces a lever 53 which normally constricts the flexible tube 48 thereby releasing the constriction so that water can enter the upper part 42 of the cylinder above the piston; the movement of the lever 53 can alternatively be used to operate a valve adapted for opening and closing said water passage. The sliding plate 51 has a slot, into which a pin 54 extends. During the ascent of the plate 51, the pin 54 strikes an inclined plane face 55 of the slot, causing the plate 51 to be displaced towards the right (FIG. 1) and become disengaged from the pin 50. The plate 51 is then displaced by a return spring 56 so that the lever 53 is free to return to its initial position under the influence of a return spring 57, thus interrupting the flow of water through the tube 48. The pin 54 is arranged to be adjustable in the slot, to enable the quantity of water to be supplied to the cylinder 37 to be varied.

The cylinder 37, in the at-rest position, is aligned with a fixed filter carrier 58 having a cavity dimensioned to receive the lower projection 44 of the cylinder. This cavity is closed at the bottom by a movable filter 59, below which is a duct 60 for discharging prepared coffee. A gasket 88 is provided in an annular recess about the base of the projection 44 to provide a seal between the fixed filter carrier and the cylinder during the discharge of coffee. A rod 61 is provided, slidable axially of the fixed filter carrier 58 and connected to the center of the lower movable filter 59; at its opposite or lower end, the rod 61 terminates in an enlarged head 62. A return spring 63 is interposed between the base of the fixed filter carrier 58 and the head 62. For the purpose of raising the lower filter 59 and the pellet of used coffee 64, two connecting rods 65 are provided (FIG. 2), anchored at the top to the transverse pin 32 and connected together at the bottom by a pin 66 via two tension springs 67; raising of the pin 32 raises the connecting rods 65, causing the pin 66 as it strikes the head 62 of the rod 61 connected to the movable filter 59 to raise the filter itself as far as the level of the upper plane face 68 of the fixed filter carrier 58, thus placing the used pellet 64 in a position to be expelled; the pin 66 then is arrested against the face 69 of a partly inclined slot 70. The connecting rods 65 can ascend further, thus bringing the springs 67 into tension. In a vertical guide of the cylinder 37, there is slidably mounted a pallet 71, maintained in contact with the plane face 68 by a spring 72.

Figure 4:
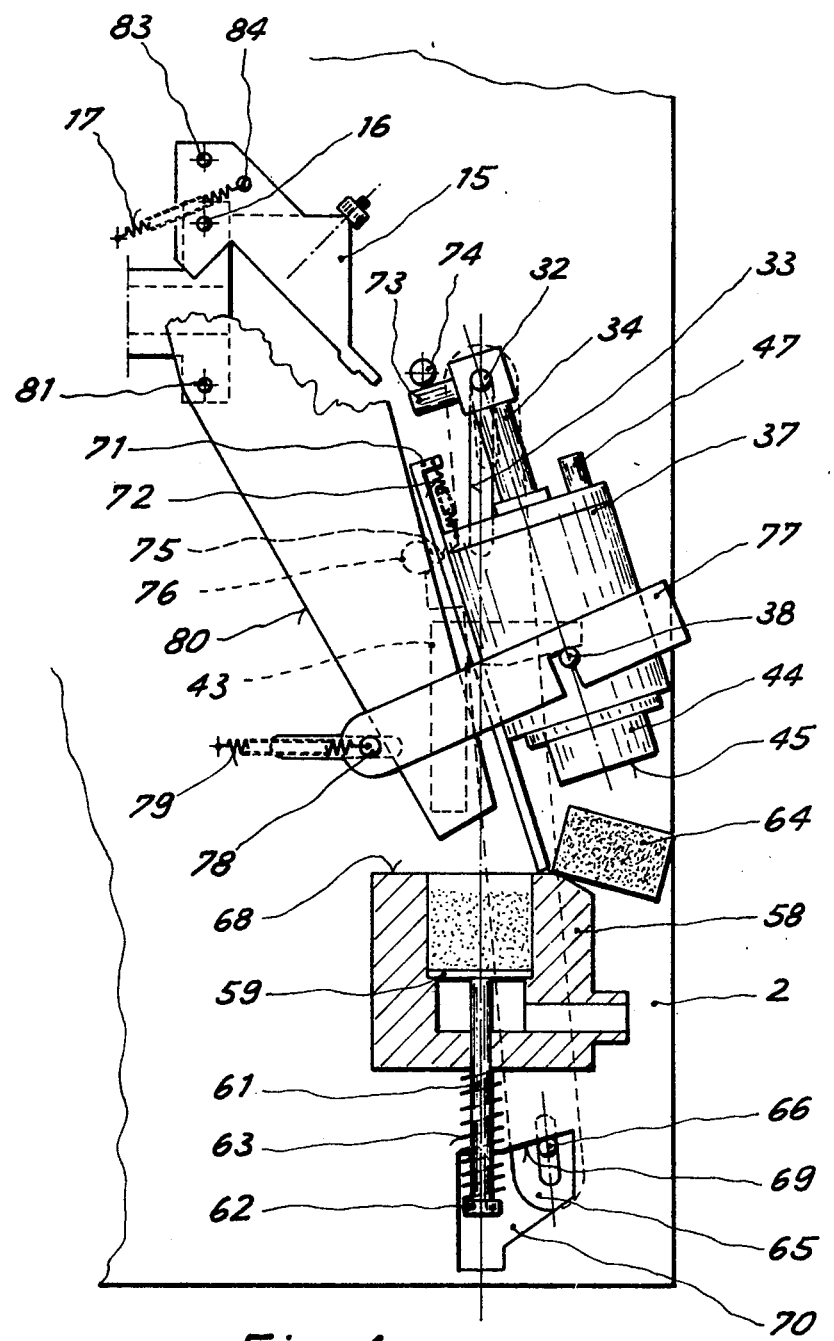
FIG. 4 shows the same detail as FIG. 3 with the cylinder deflected and the lower filter retracted into the fixed filter support.

The pin 32 carries a lateral projection 73 adapted to strike a fixed pin 74 during the ascent of the cylinder 37. Such impact causes the pin 32 to rotate and to angularly displace the cylinder. During the ascending stroke of the pin 32 and of the piston, the connecting rods 65 also rise, and are displaced laterally by the combined effect of the engagement of inclined faces 75 provided on the connecting rods themselves with another fixed pin 76 and also of the inclined face 69 and springs 67 (FIG. 4). In this way, the pin 66 is disengaged from the head 62 and the spring 63 can return the filter 59 into the cavity of the fixed filter carrier 58.

Two connecting rods 77 (FIGS. 2 and 3) are firmly connected to the lateral trunnions 38 and are hinged on a pin 78 slidable in a slot against the influence of two restoring springs 79. A chute 80, pivoted at 81 (FIG. 4) is pulled by the pin 78 and is angularly displaced to bring its lower end to a position above the fixed filter carrier 58.

With the angular displacement of the cylinder 37, the pallet 71 is also displaced and its lower end, sliding along the plane face 68, expels the pellet 64 from the filter 59 (FIG. 4).

The sliding pin 78 which pulls the chute 80 in the final portion of its travel brings the wall of a slot 82 of the chute 80 into engagement with a pin 83 which projects from an appendage integral with the metering device 15 and causes instantaneous tilting of the metering device 15 as soon as the point of attachment 84 of the spring 17 passes the point of equilibrium (FIG. 4), that is to say, the pivot point 16 of the metering device. Ground coffee thus descends from the metering device through the chute 80 into the cavity of the fixed filter carrier 58. Two levers 85 (FIG. 1) are provided for actuation by the pin 32 at the end of travel of the piston and operate to displace the rod 10 to engage the clutch plate 7 with the clutch plate 5. The cylinder 37 and the fixed filter carrier 58 are equipped with electrical resistors 86 and with associated adjustable thermostatic controls 87. The volume of the cavity 14 of the metering device 15 can be varied by means of a screw 89 which deforms a membrane 90.

The grain size of the ground coffee powder can be adjusted manually by a screw 91 which is connected by means of a micrometer screw to a pin 92 and acts upon two symmetrical levers 93 which are pivoted at 94 and raise an outer ring 95 of a support bearing of the grinder shaft 6.

The operation of the machine described above (corresponding to one complete rotation of the cam wheel 25) is as follows:

With the machine disposed as in FIG. 1, that is to say with a used coffee pellet between the filters 59 and 45, with coffee grains inside the hopper of the grinder, with water in the tank 49 and with the cylinder 37 and fixed filter carrier 58 already heated, a current pulse is supplied to the motor 3 by operation of a button. The motor starts and continues to rotate due to the current supply through the microswitch 26A. The cam wheels 25 commence to revolve and the grinder grinds the coffee grains 13 until the metering device 15 is full. The pressure of the powder in the metering device causes displacement of this device to free the pawl 18 leaving the rod 10 free to slide; this rod, under the influence of the spring 11, engages into the helical grooving 9 of the clutch plate 7 to disengage this plate from the lower clutch plate 5. The grinder therefore stops while the motor 3 continues to rotate.

During the grinding period, which corresponds approximately to one-third of an angular rotation of the cam wheels 25, the levers 21 of the links start to raise the cylinder 37 by acting on the rods 28, the cylinders 29 and the transverse pin 32 connected to the rod 34 of the piston 35.

In the first portion of travel of the rod 34, the piston 35 does not move, but moves immediately after the flange 39 strikes the stop 40 thus exposing the passage 41. Simultaneously, the dosed entry of water into the upper part 42 of the cylinder commences; in fact, the lateral pin 50 striking the plate 51 displaces the lever 53 and results in the constriction of the water supply tube 48 being released; the closing of this constriction is actuated by the same plate 51 which, by means of the adjustable pin 54, associated inclined plane face 55 and restoring spring 56, automatically returns to the at-rest position. It is also possible for a valve regulating the passage of water to be operated in a similar way by the plate 53.

The piston 35 raises the cylinder with it by the action of friction between piston and cylinder until the instant at which the cylinder itself stops by contact of its lateral trunnions 38 with the fixed stop 43 (FIG. 3). The piston then continues to ascend (still thrust by the levers 21 acting upon the members 28 and 29 and thus upon the pin 32), overcoming the friction between piston and cylinder, until the end of its upward stroke, and displaces the water from the upper part 42 of the cylinder into the lower part below the piston through the aperture 41. At a certain point, the filter 59 commences to ascend; in fact, the two levers 65 and the pin 66 connecting them at the bottom are caused to ascend by the pin 32; these levers, acting through the pin 66 which is below the rod 61, raise the filter 59 together with the associated pellet 64, stopping when the filter is at the level of the plane surface 68 of the fixed filter carrier 58.

When the sliding of the piston in the cylinder has reached the upper limit of its stroke, the pin 73 projecting from the transverse pin 32 strikes against the fixed abutment 74, thus compelling the cylinder to be angularly displaced.

The maximum displacement or deviation is reached at the end of the ascending stroke of the pin 32. The contact of the projections 75 of the rods 65 against a fixed abutment 76 causes the pin 66 to disengage from the head 62 of the rod 61 with the result that the spring 63 brings the filter 59 back into its initial position as soon as the pallet 71 associated with the cylinder 37 has expelled the pellet 64. The angular displacement of the cylinder, acting through the connecting rods 77 and the pin 78, displaces the chute 80 and opens the coffee metering device 15, and ground coffee falls onto the lower filter 59. The return phase of the cylinder 37 then commences. The rods 21, returning downwards, displace the pin 32 downwards; the connecting rods 77, acting through pin 78 and spring 79, bring the cylinder into alignment with the fixed filter carrier, arresting it with its trunnions 38 against the fixed stop 43; the chute is also retracted, and the coffee metering device is brought into the closed position. The descent of the cylinder 37 then commences; when the projection 44 of the cylinder bears on the coffee, it compresses it slightly; further descent causes the cylinder 37 to come to bear on the fixed filter carrier 58, creating a seal between these two elements by means of the gasket 88. The further travel of the lever 21 to bottom dead center causes a further compression of the springs 30 through the rods 28 and consequent pressurising of the water in the cylinder. At bottom dead center of the rods 24, the motor 3 stops as a result of the roller 26 of the microswitch 26A entering the recessed portion of the cam wheel 25 and opening the microswitch.

The coffee is then delivered until all the water has been completely expelled by the piston. In this condition, the pin 66 returns beneath the head 62 of the rod 61.

At the instant before the pin 32 stops, the rods 85 cause the rod 10 to be pulled back and thus the clutch plate 7 to engage with the clutch plate 5, thus preparing the grinder for a succeeding cycle.

What is claimed is:

1. An automatic machine for the production of coffee from coffee beams comprising a support frame, a grinder supported by said frame, a metering device associated with said grinder to receive ground coffee and displaceable between an open and a closed position, a motor operable to drive said grinder, clutch plates interposed between said motor and said grinder to transmit drive, lever means associated with said metering device and operable by said metering device to control the engagement of said clutch plates to interrupt the drive from the motor to the grinder, a displaceable water dispensing piston and cylinder arrangement operable to heat and dispense water and including an upper filter, a source of water, the piston having a rod and means associated with the rod of the piston operable to raise said cylinder and to control the flow of water from said source to said cylinder while said cylinder is being raised from a lower to an upper position, spring means connected to said piston rod and operable to apply through said piston at the end of the return stroke thereof a pressure upon water in said cylinder, deflecting means operable to displace the cylinder at the end of the upward stroke of the piston, a pallet connected to and displaceable with said cylinder, a fixed filter carrier into which said cylinder extends in the lower position and free of said cylinder in the upper position thereof, a lower filter within said fixed filter carrier for the support of ground coffee, rod and spring means operable to displace said lower filter within said fixed filter carrier in preparation for the ejection by said pallet of a pellet of used ground coffee supported thereon, a chute displaceable between an inoperative position and an operative position above said fixed filter carrier for the supply of ground coffee thereto and operatively associated with said metering device to open and close said metering device by such displacement and receive a metered quantity of coffee therefrom and program means driven by said motor and operable in timed sequential relationship to raise said piston and cylinder arrangement, supply water to said cylinder from said source, raise said lower filter, expel a pellet of used ground coffee therefrom, return said lower filter, deliver ground coffee thereto, return said piston and cylinder arrangement and supply water to said fixed filter carrier.

2. A machine according to claim 1 in which said piston and cylinder arrangement is arranged to receive water from said source to one side of said piston and valve means is provided operable by displacement of said piston and cylinder arrangement to place said one side of said piston with the other side.

3. A machine according to claim 2 in which said piston has a limited degree of lost motion relative to said cylinder to allow the water to flow from one side thereof to the other.

4. A machine according to claim 1 including a reduction gear connected to said motor, a connecting rod and crank system connected to said motor through said reduction gear and including a linkage system connected to said cylinder raising means and projections on said cylinder operable to limit the displacement of said cylinder when being raised to allow displacement of said piston relative thereto.

5. Machine according to claim 4 characterised by the fact that said connecting rod and crank system are constituted substantially of linkage movements with oscillating rods connected to said means for raising the cylinder, said cylinder being moreover equipped with lateral projections for arresting it in a position such as to leave the piston free to slide, overcoming the friction between piston and cylinder.

6. A machine according to claim 1 in which the means for raising said water dispensing cylinder includes a pressure applying piston and cylinder arrangement incorporating spring means operable to transmit a pressure to the water in said dispensing cylinder.

7. A machine according to claim 1 including a displaceable rod operable to displace said piston, and wherein said program means includes cam means driven by said motor and operable to drive said displaceable rod.

8. Machine according to claim 1 characterised by the fact that said piston is slidably sealed in the cylinder and is equipped with a valve adapted for causing the water to pass from the upper part to the lower part of the piston, said valve being substantially machined, leaving the rod free to slide for a short distance in the piston during the first portion of movement, the valve opening when the cylinder ascends and closing when the cylinder bears upon the fixed lower filter support.

9. Machine according to claim 1 characterised by the fact that said means for raising the cylinder are constituted of cylinders, inside which there slides a piston equipped with a rod incorporating a spring precompressed between the piston head on the side towards the rod and the base of the cylinder, said spring acting as elastic means for applying pressure to the water.

10. Machine according to claim 1 characterised by the fact that said cam means for deflecting the cylinder are constituted of eccentric pins associated with the rod for operating the piston and disposed in such a manner as to strike against fixed stops.

11. Machine according to claim 1 characterised by the fact that the means for raising the lower filter are constituted of rods, capable of being raised in conjunction with the piston rod and acting in opposition to springs connecting a pin which operates the lower movable filter, said rods being moreover capable of being displaced by the impact of an inclined plane projecting from said rods against fixed stops, thus permitting the instantaneous return of the lower filter.

12. Machine according to claim 1 characterised by the fact that said further means for the displacing of the chute are constituted of connecting rods, associated with return springs, and coupled to the cylinder.

13. Machine according to claim 1 characterised by the fact that said means for coupling said clutch plates are constituted of a sliding rod, acting upon said levers for coupling and uncoupling the clutch plates, and actuated by the piston rod.

14. Machine according to claim 1 characterised by the fact that the metering of the water into the cylinder is actuated by means of a slidable rod with adjustable stroke, associated with a return spring and operated by the piston rod, said slidable rod acting upon a lever associated with a return spring constituting the means for arresting the passage of the water supplied from a vessel above.

15. Machine according to claim 1 characterised by the fact that said adjustment of the quantity of coffee ground in the metering device is obtained by means of the deformation of an elastic membrane wall by means of a micrometer screw.

16. Machine according to claim 1, wherein the grinder has a support shaft, the support frame has an outer ring constituting a support bearing for the grinder support shaft, and further comprising a system of levers acting to displace the outer ring axially for adjustment of the grain size of the grinder.

17. An automatic machine for the production of drinking coffee from coffee beans comprising a grinder for grinding the beans, a motor for driving the grinder, a metering device for receiving ground coffee from said grinder, latch means responsive to a metered quantity of coffee in said metering device to disconnect said motor from said grinder, a source of water, a water dispensing displaceable piston and cylinder arrangement, normally closed means for supplying water from said source to said dispensing piston and cylinder arrangement, opening means associated with said piston and cylinder arrangement and operable by displacement thereof to open said normally closed water supply means, water heating means associated with said dispensing piston and cylinder arrangement, a fixed filter support, a lower filter within said fixed filter support for supporting ground coffee and displaceable between a lower coffee making position and an upper position for the ejection of used coffee, a chute displaceable between an inoperative position and an operative position for the delivery of ground coffee from said metering device to said fixed filter support, connecting means between said chute and said metering device operable to open said metering device to said chute in response to displacement of said chute to the operative position, a pallet displaceable with said dispensing piston and cylinder arrangement and operable to eject used coffee in the upper position of said lower filter, camming means associated with said piston and cylinder arrangement responsive to displacement thereof to angularly displace the piston and cylinder arrangement and said pallet, a projection associated with said dispensing cylinder operable to enter said fixed filter support to confine the ground coffee therein and to supply water thereto from said dispensing cylinder and displaceable with said cylinder between a position in which it extends into said fixed filter support and a position free therefrom, a linkage system driven by said motor operable sequentially to displace said piston and cylinder arrangement away from said fixed filter support to free said projection therefrom and to open said normally closed water supply means, displace said lower filter to said upper position, angularly displace said piston and cylinder arrangement and said pallet to eject used coffee, bring said chute to the operative position to deliver a metered quantity of ground coffee to said fixed filter support and return the piston and cylinder arrangement, the lower filter and the chute to an initial starting position.

18. Automatic machine for the production of coffee from coffee beans characterised by the fact that it is constituted of a support frame composed of two plates, incorporating a grinder with metering device capable of being opened, the grinder being connected to a motor by means of a clutch with face-plate engagement and capable of being actuated by said metering device through a system of levers, a connecting rod and crank system with programmed arrest being connected to said motor through a reduction gear, this system being adapted for causing a heated hydraulic group to recede from and approach towards a heated, fixed filter carrier, this hydraulic group being constituted of a cylinder with piston incorporating the upper filter, having a combined function of water heater, pressure cylinder for the water and used pellet expeller, the piston rod being equipped with rod-shaped means adapted for raising said cylinder while it is being supplied with water under gravity, and connected to springs adapted for generating the pressure of the piston itself upon the water at the end of the return stroke, eccentric or similar means being associated with the rod of said piston and with said cylinder, these means being combined with fixed members adapted for causing the cylinder to deflect from a fixed filter carrier beneath it at the end of the upward stroke of the piston, rod-shaped means being moreover provided, associated with springs and other fixed means, adapted for raising the lower filter together with the used pellet simultaneously with the ascent of the cylinder, in such a way that said pellet can be expelled by pallet means associated with said cylinder, further rod-shaped means, coupled to the cylinder during the rotation and opposed by return springs, being provided both for displacing a chute connecting the metering device with said fixed filter carrier and causing simultaneous opening and closing of the metering device itself, and also for bringing the cylinder into alignment with said fixed filter carrier at the commencement of the return stroke, this occurring in a position such as to enable the cylinder to center upon and become supported upon said fixed filter carrier, so as then to permit the piston subjected to the load of the springs to compress the water heated in the cylinder onto the powder beneath, thus delivering the coffee, and finally cam means or the like being provided for arresting the motor, and also other rod-shaped means, actuated by the rod of said piston during the delivery of the coffee and acting upon sliding levers adapted for coupling the clutch plate of the grinder to the motor in a position ready for commencing a succeeding cycle.

* * * * *